May 29, 1956  J. J. SACKETT ET AL  2,748,025
MACHINE FOR APPLYING SEALING MATERIAL TO ARTICLES
Filed April 9, 1953  7 Sheets-Sheet 1
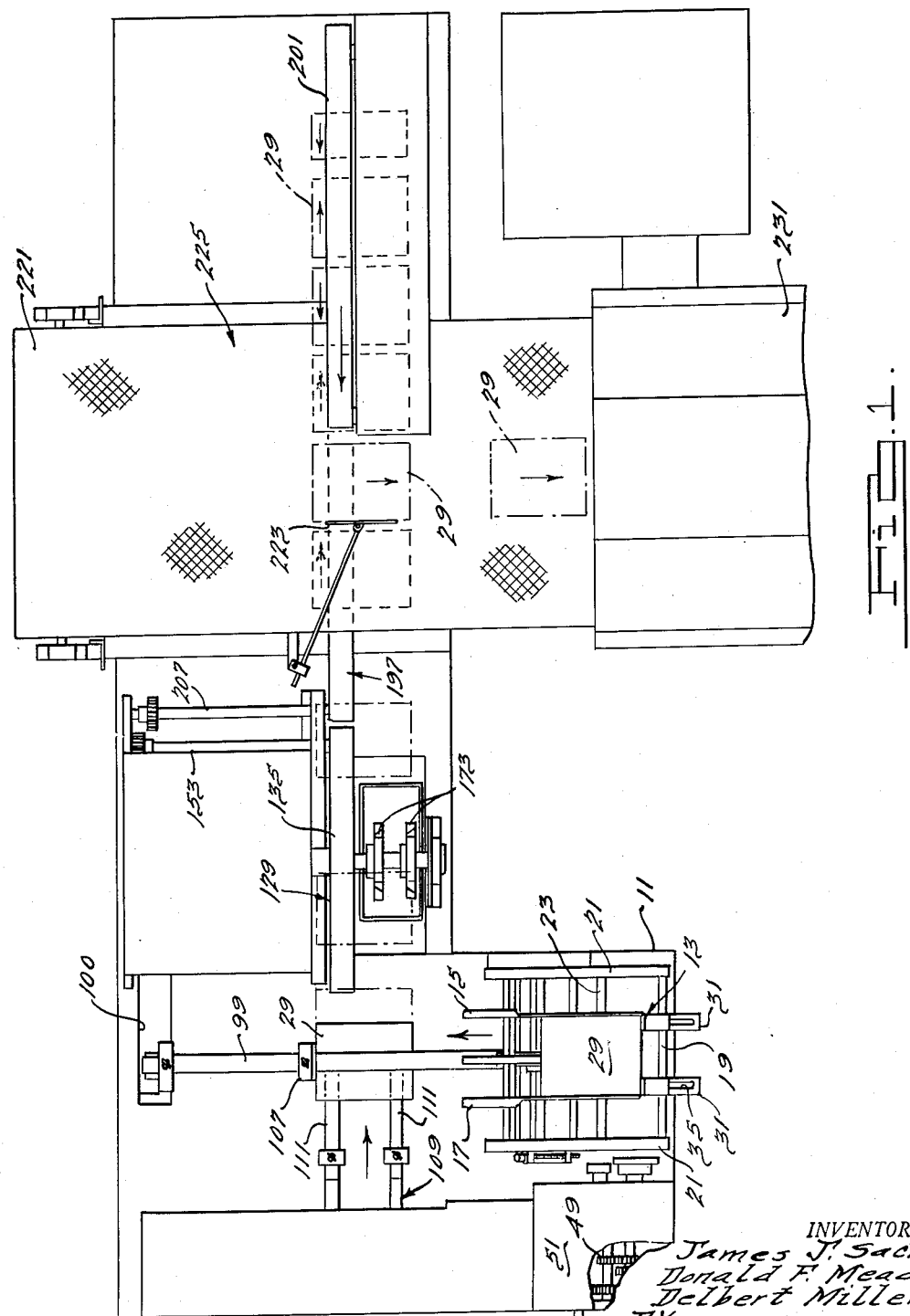
INVENTORS.
James J. Sackett
Donald F. Mead,
Delbert Miller.
BY
Harness, Dickey & Pierce
ATTORNEYS.

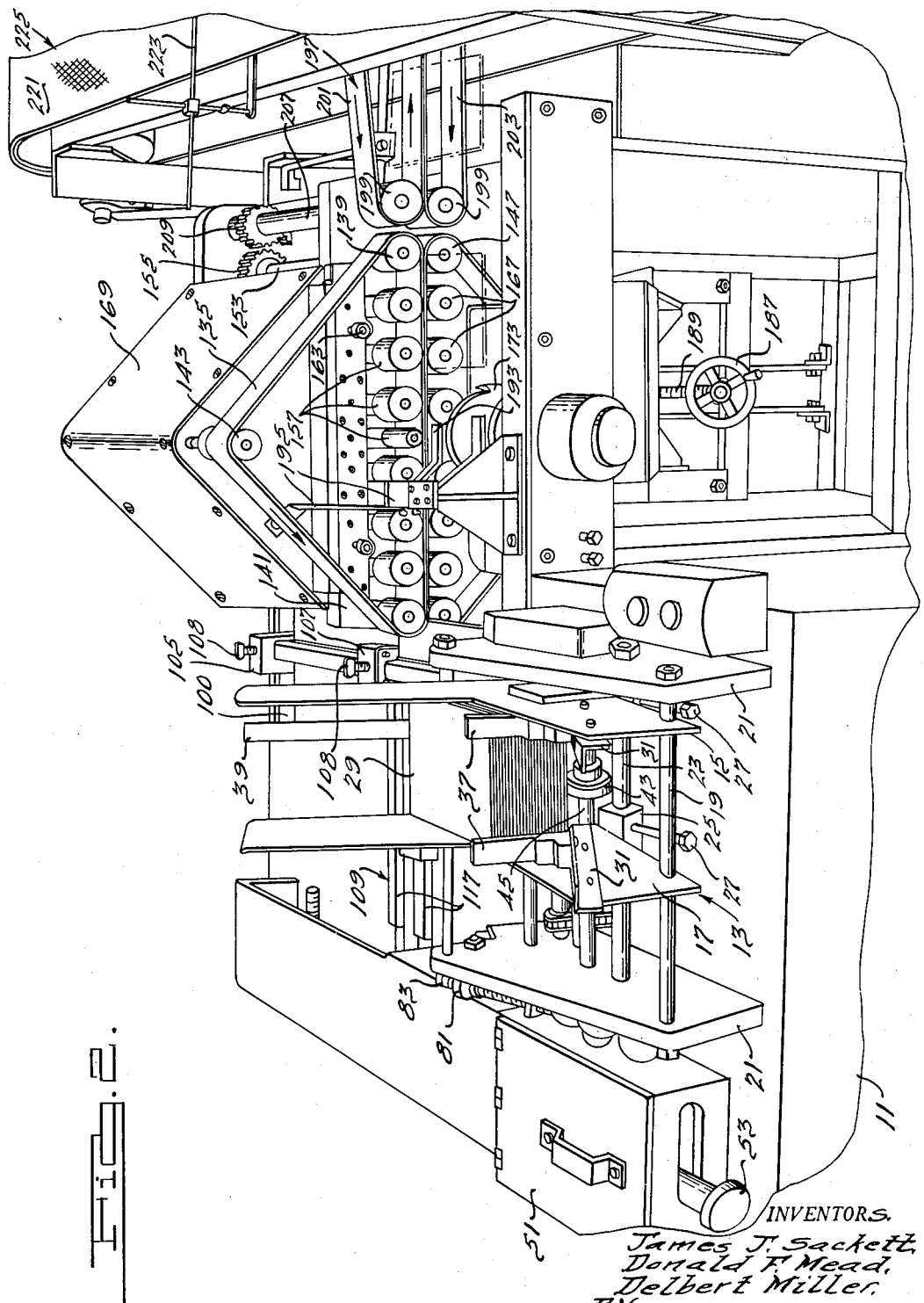

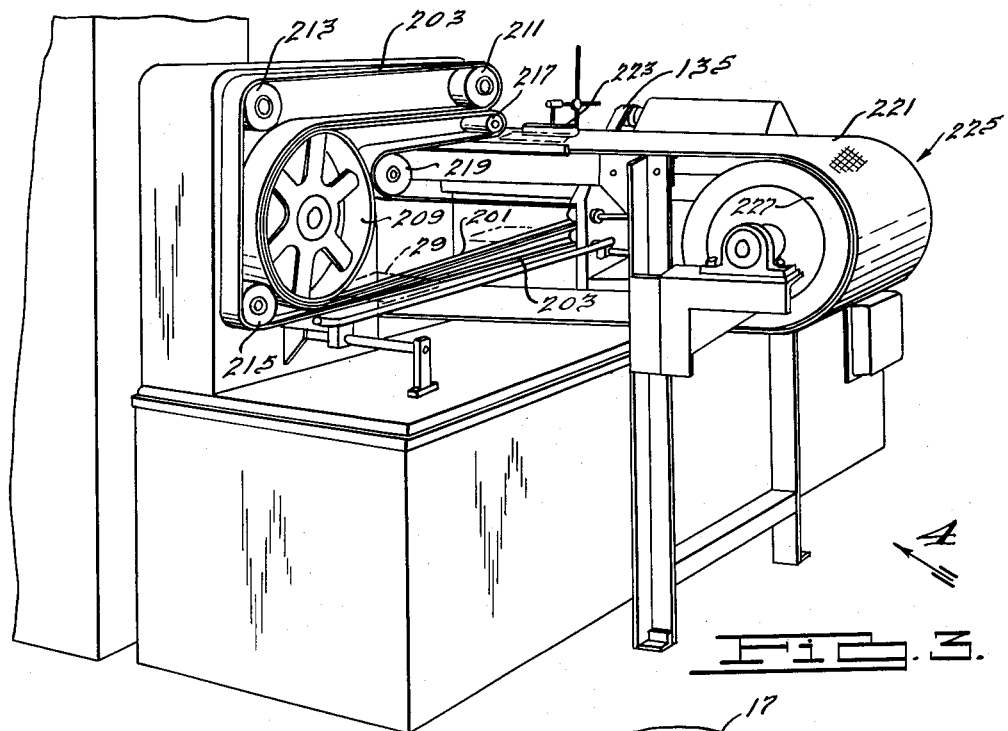
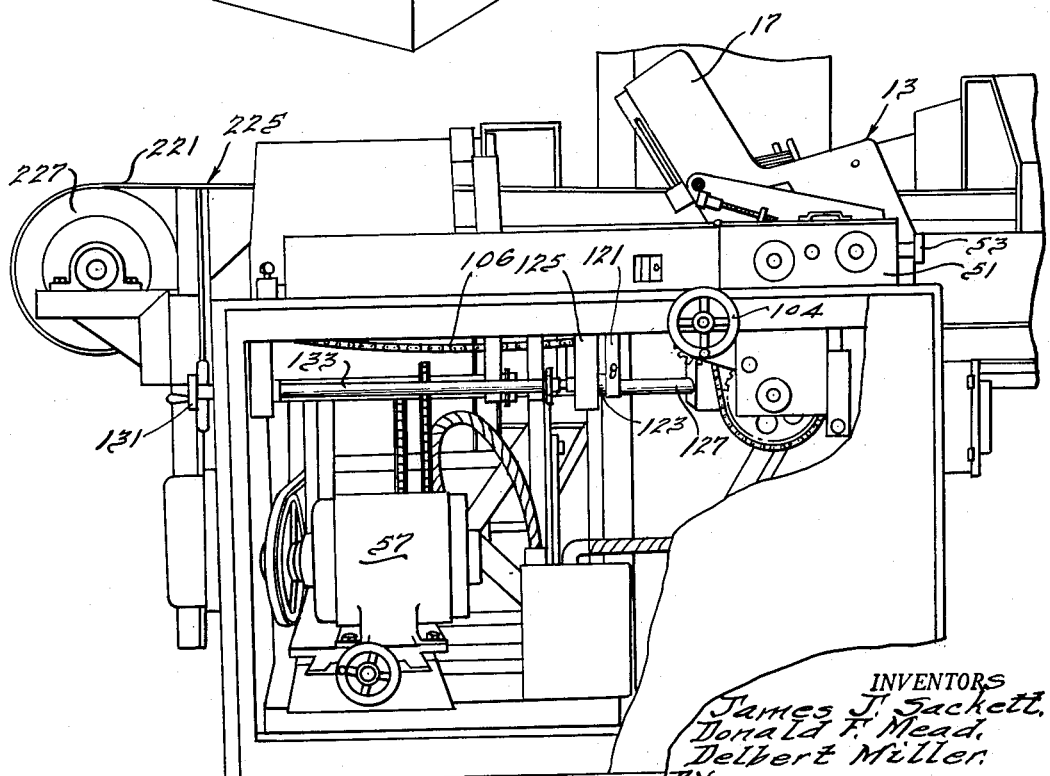

May 29, 1956 J. J. SACKETT ET AL 2,748,025
MACHINE FOR APPLYING SEALING MATERIAL TO ARTICLES
Filed April 9, 1953 7 Sheets-Sheet 4

INVENTORS.
James J. Sackett
Donald F. Mead,
Delbert Miller,
BY
Harness, Dickey & Pierce
ATTORNEYS.

May 29, 1956 J. J. SACKETT ET AL 2,748,025
MACHINE FOR APPLYING SEALING MATERIAL TO ARTICLES
Filed April 9, 1953 7 Sheets-Sheet 5

INVENTORS.
James J. Sackett,
Donald F. Mead,
Delbert Miller,
BY
Harness, Dickey & Pierce
ATTORNEYS.

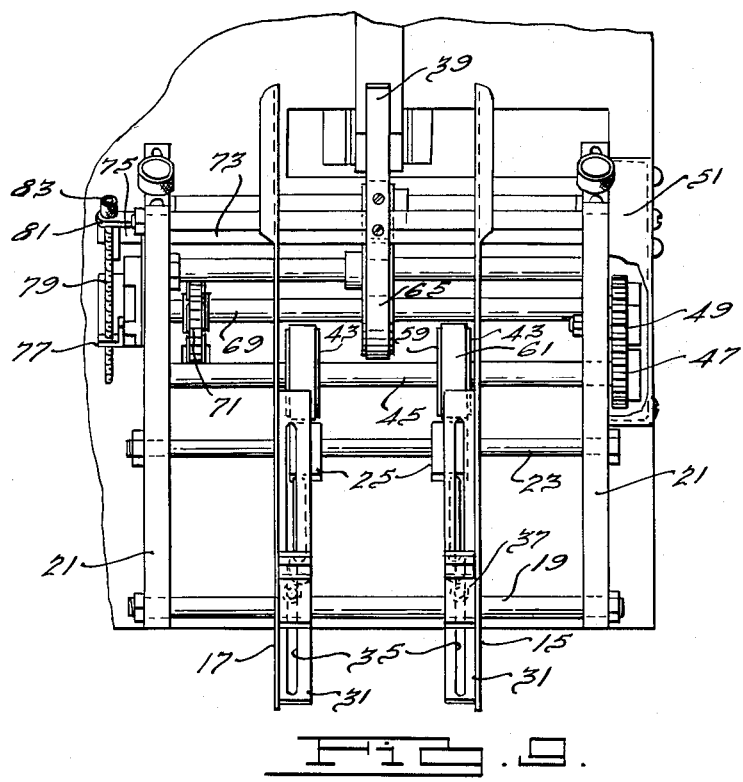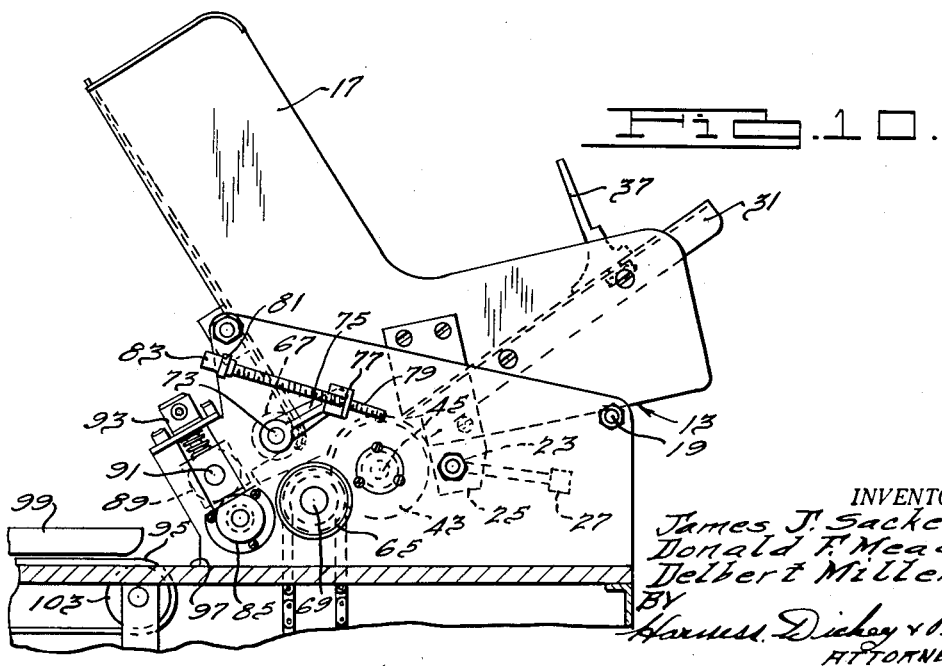

May 29, 1956     J. J. SACKETT ET AL     2,748,025
MACHINE FOR APPLYING SEALING MATERIAL TO ARTICLES
Filed April 9, 1953                                    7 Sheets-Sheet 7
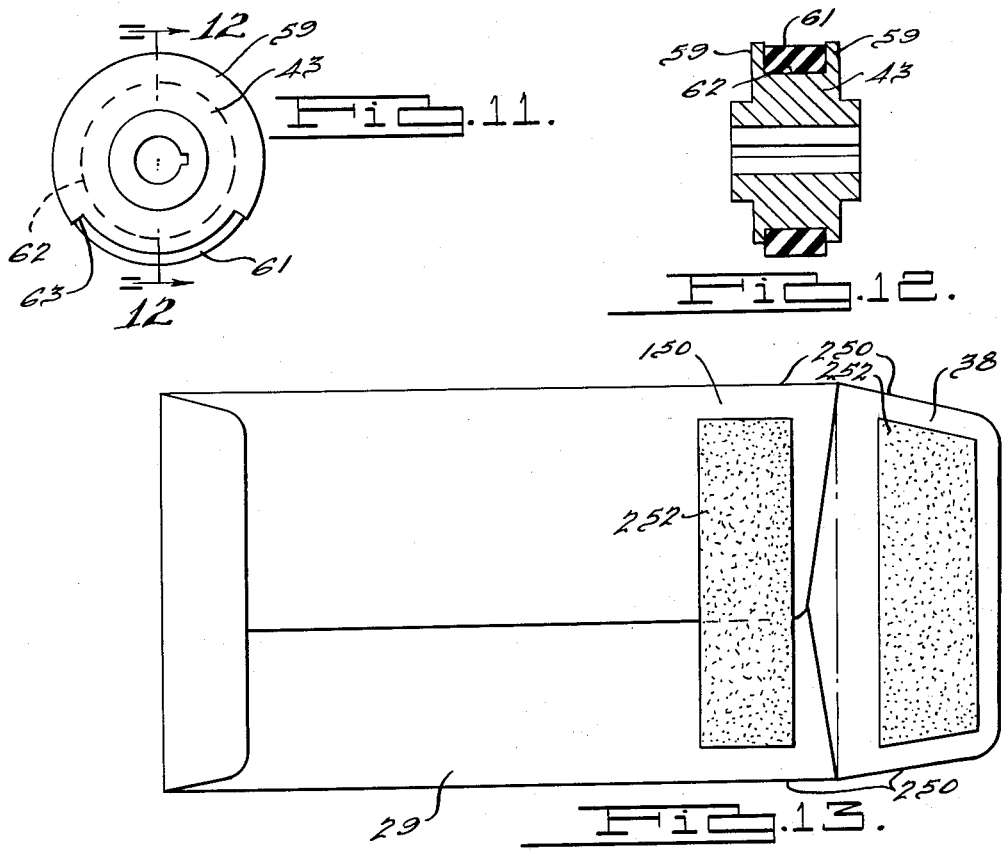
INVENTORS.
James J. Sackett,
Donald F. Mead,
Delbert Miller.
BY
ATTORNEYS.

United States Patent Office 2,748,025
Patented May 29, 1956

2,748,025

MACHINE FOR APPLYING SEALING MATERIAL TO ARTICLES

James J. Sackett, Inkster, Donald F. Mead, Garden City, and Delbert V. Miller, Allen Park, Mich., assignors to The Wolf Detroit Envelope Company, Detroit, Mich., a corporation of Michigan Application April 9, 1953, Serial No. 347,808

17 Claims. (Cl. 117—44)

This application is a continuation in part of our application, Serial No. 290,353, filed May 27, 1952, and now abandoned.

This invention relates to a machine for applying sealing material to articles and more particularly to a machine for applying sealing material such as latex to, for example, portions of flat or folded sheets, bags, or the like, and to a portion of an envelope flap and an adjacent portion of the envelope body so that when the flap is folded the portions of the flap and body having the sealing material thereon will overlap and the envelope may be sealed merely by the application of pressure.

While the machine of this invention may be used for applying sealing materials of various types, it has been found that the machine of this invention is extremely useful and advantageous in the application of latex to an envelope flap and a corresponding portion of an envelope body. The use of latex as a sealing material has the advantage that when the portion on the flap and the portion on the envelope body, to which latex has been applied, are brought into contact with each other and pressure applied thereto, the flap will be effectively sealed to the body of the envelope. The use of latex as an envelope sealing material is not new, but in the past considerable difficulty has been encountered in the proper application of the latex to envelopes. For instance, it is undesirable to have the latex, which is applied to the envelope body or flap, extend completely from one edge of the flap to the other edge thereof because the latex has a tendency to run over the edges and thus produce a messy, unsatisfactory envelope which, when the envelope is sealed, will have exteriorly disposed and visible latex. Also, when unsealed envelopes are stacked, they will not stick or bond together if the sealing material terminates inwardly of the envelope edges. Furthermore, by stopping the sealing material back from the edges it is easier to feed the envelopes through a printing or packaging machine. Still further, in the past, in the application of latex to envelopes there has been a tendency for bubbles or voids to occur in the latex, which has resulted in an unattractive appearing envelope as well as one which may not seal perfectly. Other problems, such as the rapid and efficient application of the latex, the provision of equipment which can easily and readily handle the various sized envelopes and the provision of simple, durable and automatic equipment for performing this operation, have perplexed the industry.

It is an object of this invention to provide a machine for applying sealing material, such as latex, to portions of flat or folded sheets, bags, envelopes, or the like in a speedy, efficient and neat manner, which machine can readily and easily handle various sized envelopes and the application of sealing material thereto.

It is a still further object of this invention to provide a machine of the aforementioned type, which can apply latex or other sealing material to only a desired predetermined portion or area of an article, and which will apply the latex without the presence of bubbles, voids, or other imperfections.

It is a further object of this invention to provide a machine for applying a sealing material such as latex to the underside of the flap and a portion of the adjacent underside area of each envelope.

It is a further object of this invention to provide a machine for applying latex or similar material to the underside of the flap and adjacent body portion of an envelope wherein envelopes are progressed in spaced relation with the flap of the envelope and adjacent portion of the envelope facing downwardly above a reservoir or container of latex or similar material which has provision for raising and applying the adhesive to the underside of the said flap and body portion of the envelope as each envelope passes above said adhesive reservoir.

It is a still further object of this invention to provide a machine of the aforementioned type, in which the various parts thereof may be easily adjusted or manipulated to permit the speed of operation of the machine to be varied or to permit various sized articles to be handled.

It is a still further object of this invention to provide an improved, novel mechanism for feeding articles of the aforementioned type from a hopper or chute in a speedy, positive manner and in a predetermined direction.

It is a still further object of this invention to provide a novel conveying mechanism in a machine of the aforementioned type which will convey articles of the aforementioned type in a speedy and efficient manner while at the same time retaining the same in spaced relation and in predetermined position relative to the conveyor while the sealing material is applied to the underside of the flap and the adjacent portion of the body of the articles.

It is a still further object of this invention to provide, in a machine of the aforementioned type, a novel mechanism for directly applying the sealing material to articles being conveyed so that the sealing material will be located in the proper position on the envelope and will be properly applied without imperfections.

It is a still further object of this invention to provide a machine of the aforementioned type which may be connected to or used in conjunction with a suitable envelope folding machine so that the entire envelope may be formed, folded, and have the sealing material applied in an automatic, continuous operation.

These and other objects of this invention will become apparent from the following detailed description, taken in conjunction with the accompanying drawings, in which:

Fig. 1 is a generally diagrammatical plan view of the machine of this invention;

Fig. 2 is a perspective view of the machine of this invention, showing primarily the upper portion of the machine and the envelope feeding, conveying and sealing material applying mechanisms;

Fig. 3 is a perspective view of the machine of this invention, showing a portion of the conveying mechanism, as well as the mechanism for carrying the envelopes through an oven for the drying of the sealing material;

Fig. 6 is a perspective view of the feeding mechanism and final conveyor, as well as the drying oven of the machine of this invention;

Fig. 9 is a plan view of the feeding mechanism of the machine of this invention;

Fig. 10 is a side elevational view of the structure illustrated in Fig. 9;

Fig. 11 is a side elevational view of one of the hopper feed wheels or members;

Fig. 12 is a sectional view of the structure illustrated in Fig. 11, taken along the line 12—12 thereof; and Fig. 13 is a plan view of one of the completed envelopes after it has been processed by the machine of this invention.

Figures 4, 5:
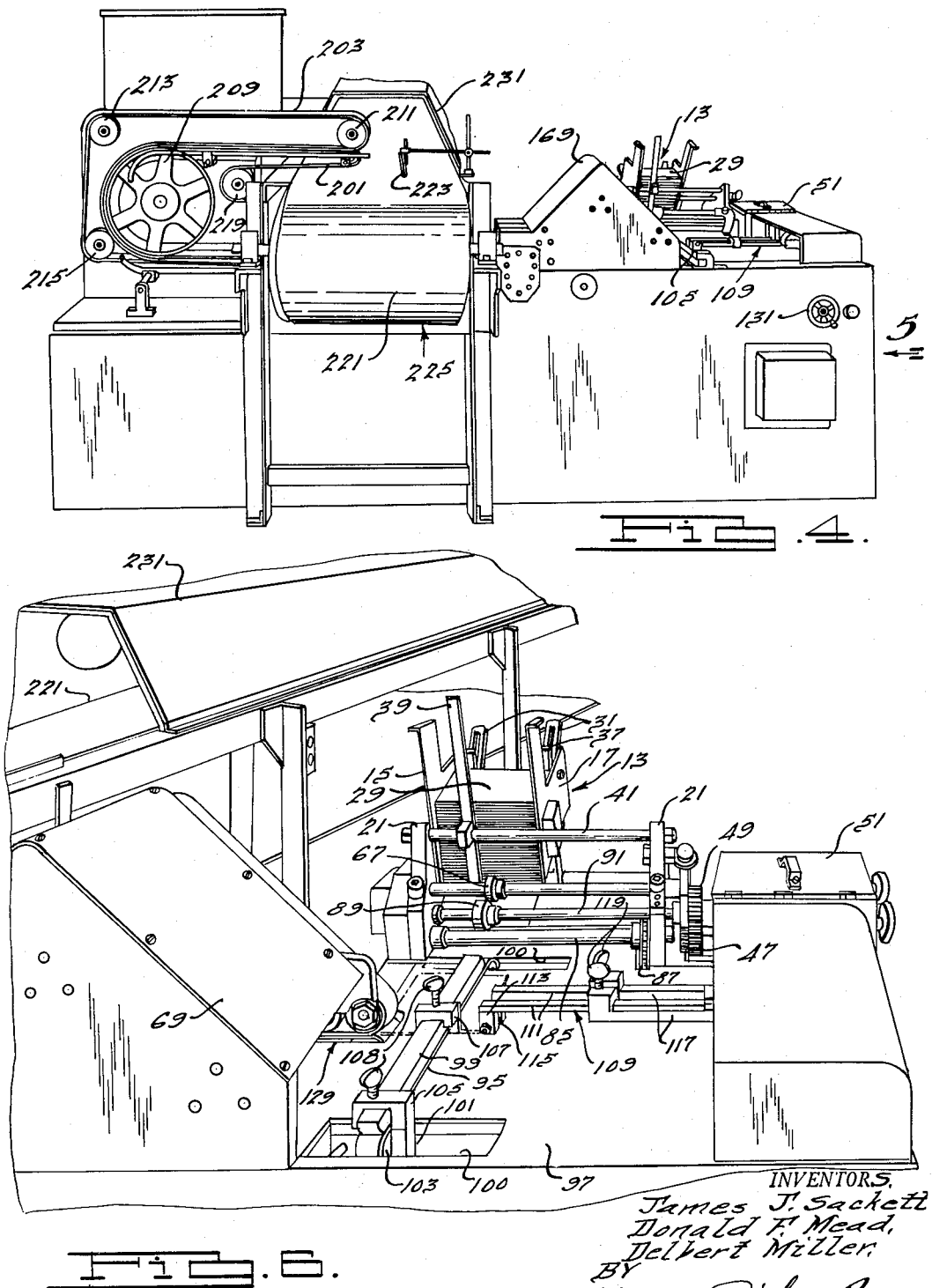
Fig. 4 is a perspective view of the machine of this invention, looking in the direction of the arrow 4 of Fig. 3.
Fig. 5 is a side elevational view of the structure illustrated in Fig. 4, with parts broken away for purposes of clarity, and taken in the direction of the arrow 5 of Fig. 4.

Referring now to the drawings, and more particularly to Figs. 1, 2, 6, 9, and 10, it will be seen that a stationary supporting structure or base 11 is provided, adjacent one end of which, the left hand end as viewed in Figs. 1 and 2, is mounted a hopper or chute structure 13 for supporting articles to which sealing material is to be applied, such as envelopes. The hopper 13 includes a pair of angular or L-shaped, in side elevation, side plate members 15 and 17. The side plate members 15 and 17 are slidably supported, adjacent their outer ends, on a cross rod 19, the opposite ends of which are supported in stationary supporting members 21. A cross rod 23, which is disposed inwardly of rod 19 is similarly supported on the supporting members 21, and the side members 15 and 17 are slidably supported on cross rod 23 by blocks 25 which can be locked on rods 23 in any desired adjusted position by means of cap screws 27. By loosening the cap screws 27 the hopper side plates 15 and 17 may be adjusted laterally along the cross rods 19 and 23 to accommodate various sized articles.

While various types of articles may be placed in the hopper 13, a stack of envelopes 29 is illustrated as being placed in the hopper or chute 13 and the opposite sides of the envelopes rest on inclined angle members 31, which in turn are connected with the hopper plates 15 and 17. Supported in slots 35 in the angle members 31 are upstanding plates 37 which are adjustable relative to the angle members 31 so as to properly engage the back edges of the envelopes 29. The envelopes are placed on the hopper or chute 13 with the flaps 38 thereof at the back or outer end and with the inside of the flaps facing downwardly, for a reason which will appear. The side plates 15 and 17 of the hopper are adjusted relative to each other to properly engage and support the envelopes 29 in their stack arrangement, and an upstanding fingerlike plate 39 is supported at the front or inner end of the hopper 13 between the side plates 15 and 17 on a cross rod 41, so as to engage the front edges of the envelopes and maintain the same in the stacked arrangement. The fingerlike plate 39 is adjustable laterally on the rod 41 to accommodate various sized envelopes. Except for the angle members 31 the bottom of the hopper or chute is open so that individual envelopes can be fed out of the hopper from the bottom thereof. Disposed below the envelope stack are a pair of spaced wheel-like feed members 43, which are connected to a cross shaft 45. The cross shaft 45 is rotatably supported in the stationary members 21 and carries a gear 47 (Fig. 9) on one end thereof, which meshes with gearing 49, housed in a gear box 51. The gearing 49 is of the change-speed type, and a lever 53 projects from the gear box 51 to permit the gears to be shifted to vary the speed of operation of the feed mechanism, as will be more fully hereinafter described.

The gearing 49 is connected through a suitable drive arrangement with a motor 57 disposed adjacent the bottom of the base, as can be seen in Fig. 5. The motor 57 drives all of the moving parts of the machine and is connected with the various parts of the machine through suitable gears, belts or chains, some of which will be hereinafter brought out in detail. The feed members 43 are preferably made of metal and have opposed side flanges 59 thereon projecting radially beyond the peripheral wheel portion 62, therebetween, throughout the majority of the circumferential extent of the latter. A rubber band or beltlike member 61 extends around the member 43 in engagement with peripheral portion 62 and with its outer periphery disposed radially inwardly of the periphery of the flanges. The flanges 59 are however cut out or notched at 63 over a portion of their circumferential extent so that the peripheral portion of the rubber band 61 between the cut out flange portions will be exposed so that its outer peripheral portion will engage the bottommost envelope in the stack and move the same out of the hopper. Thus during each revolution of the feed members 43 the exposed portions of the rubber belts 61 will engage and feed an envelope.

Disposed forwardly or inwardly of the segmental feed members 43 is a rotary feed member 65 of a similar construction to the members 43, and supported above the roller 65 is an idler roller 67. The roller 65 is mounted on a cross shaft 69 which in turn is rotatably driven through a chain 71 connected with the driving mechanism and change speed gearing 49. The roller 67 is supported on an eccentrically supported cross shaft 73, the opposite ends of which are journaled in the stationary members 21. Connected with the outer end of the shaft 73 at one side of one of the stationary members 21 is a crank arm 75, the free end of which carries a bracket 77 which threadably receives the lower end of a threaded screw member 79. The upper end of the screw member 79 is rotatably supported by a bracket member 81 connected to the stationary member 21 and the screw has a head 83 thereon which, when turned, will cause the crank arm 75 to rotate the shaft 73, and the rotation of the shaft 73 will move the roller 67 either toward or away from the roller 65. The roller 67 is preferably arranged so that its outer periphery is spaced from the periphery of the segmental portion of the roller 65 substantially the thickness of the envelopes being fed through the machine. Therefore, the roller 67 acts as a skimmer to prevent more than one envelope from passing between the rollers while the feed roller 65 aids in moving the envelope out of the hopper.

An elongated roller or shaft 85 is supported forwardly or inwardly of the roller 65 and is journaled in the stationary members 21 and rotatably driven by a chain 87 connected with the drive mechanism of the machine. Disposed above the elongated roller or shaft 85 is an idler roller 89, which is supported on a cross shaft 91, the opposite ends of which are supported in the stationary members 21. The spacing between the roller 89 and the roller 85 may be adjusted by a spring-loaded adjuster 93 so as to maintain frictional engagement of the rollers 89 and 85 with the envelopes. The roller 85 is adapted to add further impetus to movement of the envelope and move the envelope completely out of the hopper and onto a belt conveyor 95, which extends laterally across a platform or surface 97 disposed forwardly or inwardly of the hopper 13. A guide plate 99 is adjustably supported above the belt conveyor 95 by suitable brackets 101, extending through elongated slots 100 adjacent opposite sides of platform 97, and supported beneath the platform on an adjustable structure not shown in detail, but the operation of which will hereinafter appear. The bottom surface of the guide plate 99 is disposed just above the top of the upper horizontal run of the belt 95 and has roller bearings engaging the belt to reduce friction therebetween while maintaining the envelopes in engagement with the belt for conveyance. The endless belt 95 extends around pulleys 103 supported on brackets 101 on opposite sides of the platform 97 and one of the pulleys is driven through a suitable connection with the driving mechanism of the machine. The plate 99, brackets 101, pulleys 103 and belt 95 are supported by the movable structure below platform 97 for adjustment in a direction at right angles to the direction of feed of the envelopes from the hopper, so that the belt and plate will always be properly centered relative to the hopper and its feed mechanism. A handwheel 104 is positioned at one end of the machine (Fig. 5) and operatively connected with the brackets 101 and supporting structure for adjusting the same through a drive mechanism, including chain 106. A clamplike member 105 adjustably connects plate 99 to a bracket 101. An envelope stop member 107 is slidably supported on plate 99 for adjustment toward and away from the hopper 13, against which the envelopes being carried across the platform 97 abut to prevent further movement of the same across the platform. This adjustment permits the handling of various sized envelopes as it stops the movement of the envelopes in a predetermined position in accordance with their size. The position of the plate 99 relative to member 105 and the position of the stop 107 relative to plate 99 can be easily adjusted by loosening thumb screws 108, which secure the plate 99 to member 105 and stop 107 to plate 99.

In order to move the envelopes from the platform 97 and belt conveyor 95 into a conveyor 129, running in a direction at right angles to belt 95, in which conveyor the sealing material is supplied to the envelopes, a reciprocating kicker or transfer mechanism 109 is provided. The kicker or transfer mechanism 109 includes a pair of side-by-side, spaced, horizontally extending bar members 111, which extend at right angles to the plate 99 and each of which has, depending from the inner end thereof, a vertical plate or bracket member 113. Antifriction roller or bearing elements 115 are carried by the vertical plate or bracket members 113 and rest on the platform surface 97 so that the kicker mechanism is supported for reciprocation on the platform surface 97 by the antifriction members 115. The outer ends of the bars 111 extend through apertures in the inner ends of supporting members 117. Thumbscrews 119 are carried by the supporting members 117 and are adapted to be tightened into engagement with the bar members 111 to secure the same in a desired adjusted position relative to the supporting members. By loosening the thumbscrews 119 the bar members 111 may be moved inwardly or outwardly relative to the supporting members, in accordance with the size of the envelope which is to be moved by the kicker mechanism. The supporting members 117 are connected with a suitable reciprocating mechanism which is herein illustrated as including (Fig. 5) a crank arm 121 which in turn is connected with an eccentric throw on a hub member 123 which is rotatably supported in a bracket 125. The hub member 123 is operatively connected with a shaft 127 projecting from the gear box 51 so as to rotatably drive the hub member 123. The rotation of the hub member and the eccentric connection to the crank arm 121 cause fore and aft reciprocation of the kicker mechanism so that the vertical members 113 on the inner end thereof will engage an envelope abutting stop 107 to move the same away from the conveyor belt 95 and into engagement with the conveyor 129 which moves the envelopes away from the platform 97. The kicker mechanism may be adjusted laterally on the platform 97 to accommodate various sized envelopes by means of a hand wheel 131, which is connected with a threaded adjusting shaft 133, which in turn is connected with the kicker mechanism.

Figure 7:
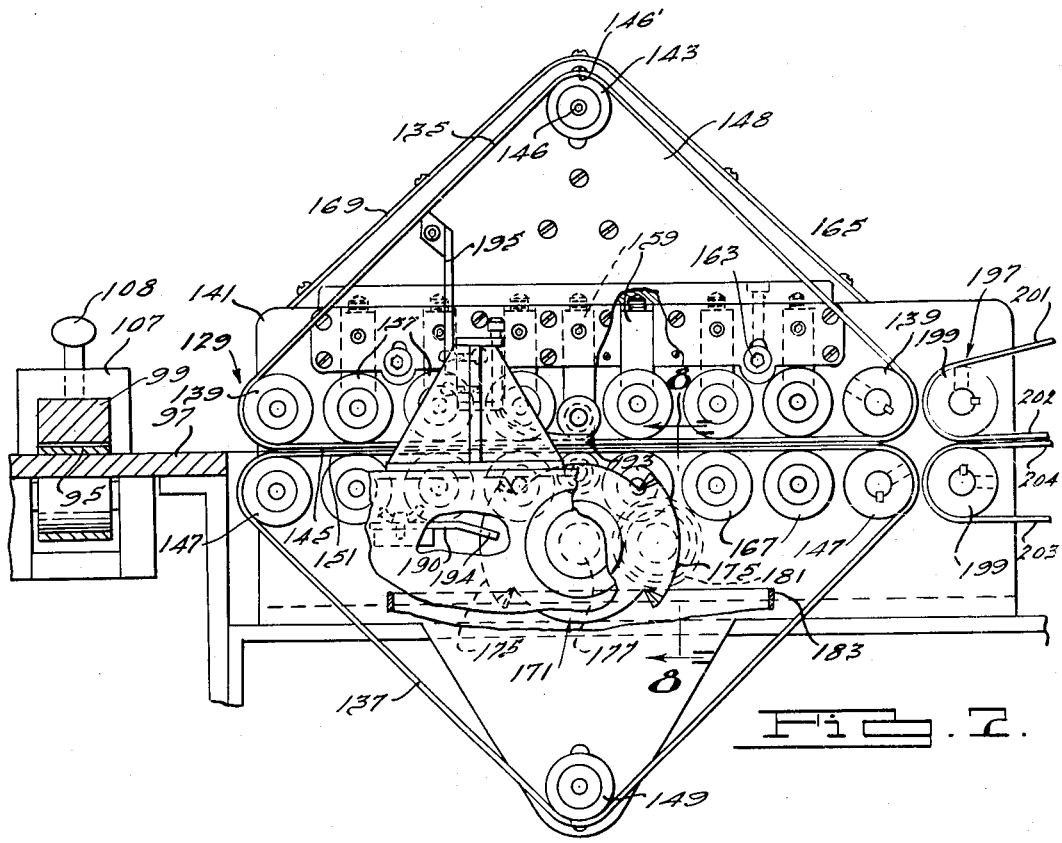
Fig. 7 is an enlarged view, partially in section and partially in elevation, of the first conveyor and the sealing material applying means of this invention.

The conveyor 129 which carries the envelopes away from the platform surface 97 includes, as can be best seen in Fig. 7, a pair of opposed endless belts 135 and 137. The belt 135 extends around a pair of horizontally aligned pulleys 139 which are spaced apart and rotatably supported in an adjustable supporting structure 141. The belt 135 also extends around a pulley 143 disposed above and between the pulleys 139 so that the belt extends around the triangularly spaced pulleys and provides a horizontal run 145 disposed slightly above the surface of the adjacent platform 97. The pulley 143 is rotatably supported on a shaft 146 supported in a vertically elongated slot 146' in a stationary supporting structure 148 mounted on the machine base or frame structure. The pulleys 139 are disposed in substantial endwise alignment with the stop 107 so that the envelopes which are fed by the kicker mechanism 109 into the conveyor 129 will be engaged adjacent only one end by the belts 135 and 137. That is, when the envelopes are stacked in the hopper 13, each envelope is positioned so that its flap portion 38 is disposed at the rear, or outer end thereof. Therefore, when the envelope is fed onto the transverse conveyor 95, the end opposite the flap engages the stop 107. Therefore, when the kicker mechanism 109 feeds the envelope into the conveyor 129 the conveyor will engage the end of the envelope opposite to the flap end so that the flap and adjacent porton 150 of the envelope overhangs the conveyor, for reasons which will hereinafter appear. Furthermore, the envelopes are positioned in the hopper so that the under surface of the flap to which the sealing material is to be applied, faces downwardly. Therefore, as the envelopes move through the conveyor 129, the envelope flaps 38 will project laterally outwardly to one side of the belts 135 and 137 and the flaps and adjacent body portion 150, to which the sealing material is to be applied, will be facing downwardly.

The conveyor belt 137 extends around horizontally spaced pulleys 147 and an intermediate vertically spaced pulley 149, in the same manner as the belt 135, so that the belt 137 has a horizontal run 151 disposed in closely spaced back-to-back relationship with the horizontal run 145 of the belt 135. The pulleys 139 and 147 are disposed in vertical alignment with each other and one of the pulleys of each pair is connected with a shaft, such as shaft 153, which in turn carries a gear 155 which operatively connects the shafts with the motor and drive mechanism so that the belts 135 and 137 will be driven by these drive pulleys.

Disposed between the pulleys 139 in closely spaced relationship are a plurality of backing roller members 157 which prevent the horizontal run of belt 135 from flexing or deflecting away from an envelope carried between the belt horizontal runs. The roller members 157 are rotatably supported by suitable members 159 in the supporting structure 141 which in turn is adjustably connected with the stationary supporting structure 148 by suitable cap screws or bolts 163. The cap screws or bolts 163 extend through vertically elongated slots 165 in member 141 to permit vertical adjustment where necessary of the backing rollers and pulleys 139, so that the belt will properly engage envelopes of varying thicknesses. As a result of slot 146' in structure 148, the upper pulley 143 can be similarly adjusted to maintain the belt 135 under the proper tension. Disposed between the lower pulleys 147, in opposed relationship to the backing rollers 157 is a second group of rotatably supported backing rollers 167, which are supported on the stationary supporting member, as are the pulleys 147 and 149. Therefore, deflection of the belts 135 and 137 along the horizontal runs is prevented by the roller backing members 157 and 167 and the horizontal runs of the belts are thus maintained in a predetermined spaced relationship. The spacing between the horizontal runs 145 and 151 of the belts is predetermined so that the belts will tightly engage and support the envelopes and prevent the same from turning or moving relative to the belts 135 and 137 as they are carried through the conveyor 129. The importance of this function will become apparent when the mechanism for applying the sealing material is described. That is, it is important that when the sealing material is applied to the projecting portions of the envelopes, that the envelopes not turn or slip relative to the conveyor belts as they are being moved thereby. A cover plate 169 is connected with the supporting structure 141 to cover the belts and prevent any injury to an operator.

Figure 8:
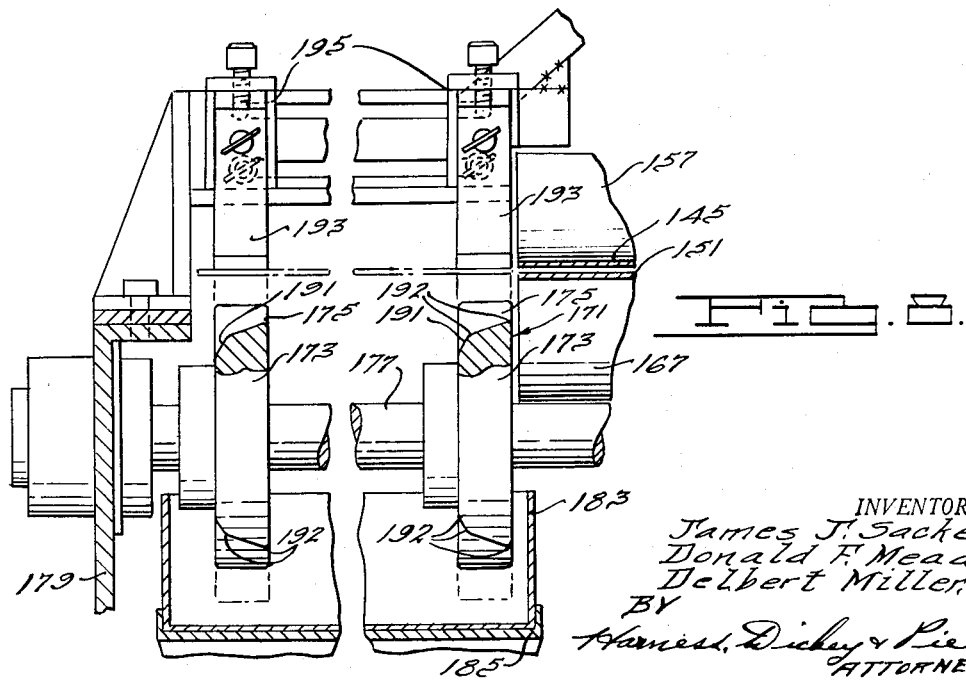
Fig. 8 is a view, partially in section and partially in elevation, of the structure illustrated in Fig. 7, taken along the line 8—8 thereof.

The mechanism for applying the sealing material to the envelope flap 38 and adjacent body portion 150 is indicated generally at 171 and is disposed below the plane of the horizontal run 151 of conveyor belt 137. The mechanism 171 includes a pair of side-by-side wheel-like members 173. In the disclosed form each member 173 has spaced, segmental, portions 175, the outer or peripheral surfaces of which lie in the surface of a common cylinder and are disposed radially outwardly of the remainder of the wheel, as can be best seen in Fig. 8. The wheel members 173 are connected with a shaft 177 which in turn is rotatably supported in stationary brackets 179 of the machine and is drivingly connected with the drive mechanism in the device through suitable gears 181 to cause the wheel to rotate at a predetermined speed. The wheels 173 are, as can be seen, easily removable so that different wheels can be used for different sized envelopes. Disposed below the wheel members 173 is a container 183 in which latex or other sealing material is placed. The container 183 is supported by a platform-like member 185, which is movable vertically in guideways and is adapted to be raised and lowered by the operation of a handwheel 187 connected therewith through suitable gears and a screw 189 (Fig. 2), so that when the container is empty or the liquid therein is below a predetermined level, it may be lowered by actuation of the handwheel 187 and refilled or cleaned out. When the container 183 is in its normal operating position, the segmental portions 175 of the wheel members 173 pass therethrough during each revolution of the wheels to pick up the liquid sealing material, such as latex, on the periphery thereof, so that the material may be thereafter deposited on the envelope adjacent flap and body portions. Scrapers 190 are adjustably mounted on the stationary machine supporting structure, adjacent wheel members 173, and have portions 194 straddling the wheel segmental portions 175 for controlling the amount of latex thereon which will be deposited on the envelopes. The opposite ends of the segmental portions 175, or the leading and trailing edges thereof, are angularly cut back on two different angles at 191, instead of being merely flat and disposed at right angles to the wheel side faces, so that the segmental portions will knife their way through the latex or sealing material, producing a minimum of turbulence or churning action in the material. It has been found that if the opposite ends of the segmental portions 175 are not angularly cut back, the rapid rotation of the segmental portions through the latex will cause excessive turbulence therein which causes air bubbles in the latex. This is an undesirable condition in view of the fact that voids or air bubbles will then be present in the latex or sealing material applied to the envelope, which makes the same unattractive in appearance and possibly ineffective for sealing. To still further reduce any tendency for air bubbles to form in the sealing material as a result of the rotation of the wheels therethrough, the sharp edges of the segmental portions and faces are radiused or rounded at 192, as seen in Fig. 8. It will thus be seen that it is desirable to shape the opposite ends of the segmental wheel portions so that they will tend to knife their way through the liquid sealing material rather than churn the same.

The circumferential extent of the peripheral surfaces of the segmental portions 175 are predetermined in accordance with the width of the envelope flap and body portions so that the sealing material will be applied to these envelope portions only in the desired locations and will not extend completely to the opposite edges of these portions. That is, it is desired that the sealing material be applied to the envelope portions 38 and 150 between the opposite edges 250 thereof and terminate inwardly of the opposite edges, because it has been found that if the sealing material extends completely from one edge of the flap or body portion to the opposite edge thereof, there is a tendency for the sealing material, when the envelope is sealed closed, to run out or overflow to the adjacent portions of the envelope, which creates a messy, sticky and undesirable condition. It is therefore important that the sealing material be applied to the envelope and terminate inwardly of the edges thereof. It is for this reason that the circumferential extent of the segmental portions 175 is carefully calculated to produce sealing strips 252 on the envelopes of a predetermined width or extent, and it is also important that the peripheral surfaces of the segmental portions, carrying the latex or sealing material, properly roll on the envelope portions as the envelopes are being carried by the conveyor 129. In this respect it can be appreciated that the speed of rotation of the wheels 173 must be timed with the speed of conveyor 129 so that each segmental portion 175 will engage and roll the sealing material on the proper portion of an envelope, each rotation thereof. In order to provide the necessary backing support on the opposite side of the envelope portions to which the sealing material is applied, backing plates 193 having flat, elongated flaring portions are supported above the horizontal run 145 of the belt 135, in vertical alignment with the applicator wheel 173. The backing members 193 are supported by suitable bracket means 195 on the supporting structure 141. Therefore, as the envelopes are being conveyed by the conveyor 129 at a predetermined speed and as the wheels 173 are rotating at a predetermined speed and the peripheral surfaces of the segmental portions 175 are of a predetermined circumferential extent, these segmental portions, after passing through the sealing material in the container 183, will roll into engagement with the adjacent flap and body portions 38 and 150 of each envelope being conveyed, and will roll a strip of sealing material 252 on each of these portions which will terminate adjacent the opposite edges thereof and which will be in alignment with each other so that when the flap 38 is folded over on the body portion 150, the strips of sealing material on the two portions will engage and the mere application of pressure against the opposite sides of the flap will cause the envelope to be sealed together.

After the sealing material has been applied to the envelopes they pass from the conveyor 129 to a third conveyor 197. It has been found desirable to use two relatively short conveyors instead of one long conveyor because less belt slippage occurs and the proper movement of the envelopes through the machine is more readily effected. The conveyor 197 includes pulley members 199 supported immediately next to the pulleys 139 and 147 of the conveyor 129 and endless belts 201 and 203, which extend around the pulleys 199 and have horizontal runs 202 and 204 disposed in alignment with the horizontal runs 145 and 151 of the conveyor 129 so that the envelopes continuously move from one conveyor to the other. The pulleys 199 are supported on rotatable drive shafts 207, having gears 209 thereon meshing with the gear 155 of shaft 153 so as to drive belts 201 and 203 at the same speed as belts 135 and 137. The belt 203 of conveyor 197 at the opposite end of horizontal run 204, from pulley 199, extends upwardly around a relatively large wheel or pulley 209 rotatably supported adjacent the back end of the machine and above pulley 199. The belt 203 extends around the wheel 209 and then forwardly in a horizontal plane, thence around a pulley 211 disposed forwardly of the wheel 209, thence rearwardly in a horizontal plane and around a pulley 213, thence downwardly around a pulley 215 disposed below the pulley 213, thence forwardly and around pulley 199. Belt 201 at the opposite end of horizontal run 202, from pulley 199 extends around the wheel 209, thence forwardly in a horizontal plane parallel to the adjacent horizontal run of belt 201, thence downwardly around a pulley 217, thence rearwardly and around a pulley 219, thence forwardly and downwardly around pulley 199.

It will therefore be seen that the envelopes which are carried by the conveyor 197 are carried rearwardly between the horizontal runs 202 and 204 of belts 201 and 203, which are in closely spaced relationship so as to properly retain them, are carried between the belts around the rim wheel 209 and thence forwardly, above horizontal runs 202 and 204. When the portions of the belts 201 and 203 carrying the envelopes pass around pulleys 211 and 217, respectively, so as to reverse their direction of movement, the envelopes drop out of engagement with the belts 201 and 203 onto a conveyor belt 221, which extends at right angles to the direction of movement of the envelopes. An adjustable stop member 223 is supported adjacent the transverse conveyor belt 221, so that envelopes which are dropped thereon from the conveyor belts 201 and 203 will not be thrown off the conveyor belt 221. The belt 221 forms a portion of a conveyor 225 and extends at one end around a driving pulley 227 and around a suitable idler pulley (not shown) at the opposite end. The belt 221 therefore extends transversely of conveyor 197 to provide a conventional endless belt type conveyor. It should be noted that when the envelopes in conveyor 197 are carried around the wheel or pulley 209 prior to being deposited on the belt 221, the position of the envelopes is reversed so that the portions of the envelopes having sealing material thereon will be disposed in an upright position, or on top, and the sealing material on the envelopes can not engage the belt 221. The position of the envelopes has therefore been reversed from the position to which they were initially fed into the machine. The belt 221 conveys the envelopes through a drying oven 231 which surrounds a portion of the belt so that the sealing material on the envelopes will be dried as it passes on the belt 221 through the oven. After the envelopes have passed through the oven and reach the opposite end of the conveyor 225 they will drop from the upper run of the belt 221 as it turns about its pulley and an operator can either remove the same or permit the envelopes to drop into packing containers in their completed state, with the sealing material applied thereto and completely dried and ready for use. It will furthermore be appreciated that the envelopes may be fed directly and automatically from an envelope folding or forming machine to the sealing material applying machine or portions of the machine without departing from the scope of the invention.

While the speed of movement of the conveyors 129 and 197, as well as the speed of rotation of the sealing material applying wheels 173, generally remain constant irrespective of the envelope size, the speed of operation of the hopper feed mechanism, as well as the kicker or transfer mechanism 109, is varied in accordance with the envelope size so as to feed the envelopes to the conveyor 129 so that the spacing of the envelopes will remain substantially the same in the conveyor 129 regardless of the size of the envelopes. In this way, with a constant spacing of the envelopes in the conveyor 129, the sealing material applying wheels will always operate properly in timed relation to the envelopes such as to engage and roll the latex or other sealing material onto the proper portions of the envelopes. As has been previously pointed out, the wheels 173 may be changed if the width of the sealing material strip is to be changed in accordance with the sizes of the envelopes. The other spacing adjustments of the envelope hopper structure, the hopper feed mechanism, the kicker mechanism, and the stop mechanism for positioning the envelopes, likewise permit this machine to easily accommodate envelopes of various sizes.

It will thus be seen that with the machine of this invention sealing material such as latex is automatically applied to the adjacent flap and body portions of each envelope in an exact, predetermined location, and the envelopes are conveyed and handled so that they can be effectively dried, whereupon, on reaching the end of the machine, the envelopes are in a finished condition.

It will furthermore be appreciated that the machine of this invention is adapted to handle various sized envelopes and applies the sealing material to all such envelopes in a speedy, efficient manner, so that a large number of the envelopes will be completed every minute that the machine is in operation. While the machine has been described as applying sealing material to envelopes, it will be appreciated that it can apply sealing material to flat sheets or other articles where a sealing operation is needed.

The operation of the particular machine illustrated can be briefly summarized by stating that the articles 29, such as envelopes, to which the sealing means is to be applied to the underside of the flap and adjacent body portion of the envelope, are fed from hopper 13 with the flaps of the envelopes facing in a downward direction by feed members 43, 65 and 85 to the belt conveyor 95. The kicker or transfer mechanism 109, moves the articles 29 with the flaps facing downward to the belt conveyor 129 with the envelopes having the flaps facing downward and extending outwardly beyond the belt conveyor, the said belt conveyor carrying the envelopes past the mechanism 171 which applies the sealing material to the underside of the flap and a portion of the adjacent body portion of the envelope. The mechanism 171 includes rotatably driven wheel members 173 and the sealing material box or container 183. The driving mechanism for the belt conveyor 129 is so related to the operating mechanism of the mechanism 171 that sealing material is applied to the flap of the envelope and the adjacent body portion thereof when the envelope is passing in juxtaposition to the rotating driven wheel members. After the sealing material has been applied the article passes to the third conveyor 197 which is of the belt type and extends around pulleys so as to reverse the position of the articles 29 so that the portion thereof having the sealing material thereon will be on top. Conveyor 197 then drops the articles 29 onto another conveyor 225 which conveys the articles through an oven or dryer to dry the sealing material.

Having thus described the invention, we claim:

1. A machine for applying sealing material to a portion of a flat or sheetlike article, including means for supporting a stack of articles to which sealing material is to be applied, a feed mechanism supported adjacent said article supporting means for moving the articles one at a time from said article supporting means in a predetermined direction, first conveyor means for receiving the articles moved from said hopper means and conveying the articles in said predetermined direction, means providing a stop to limit the movement of the articles by said first conveyor means in said predetermined direction, a transfer mechanism for moving said articles from said conveyor means in a direction angularly to said first predetermined direction, second conveyor means supported adjacent said first conveyor means for engaging and supporting articles moved from said first conveyor means by said transfer mechanism and conveying the same in the direction of movement of said transfer mechanism, said second conveyor means including a pair of back-to-back endless belt members having adjacent run portions spaced from each other a distance such as to properly engage, support and move the articles in said predetermined direction, means adjacent said conveyor means for applying sealing material to a portion of the articles being conveyed by said conveyor means, said sealing material applying means including rotatable members having spaced, cylindrical, peripheral, segmental portions engageable with the articles to apply sealing material thereto, sealing material container means supported adjacent said rotating members adapted to contain sealing material through which the segmental portions pass during their rotation to pick up sealing material and to apply the same to the articles when engaging the latter, third conveyor means for engaging and supporting the articles after the sealing material has been applied, oven means disposed in the path of movement of said third conveyor means for drying the sealing material as it is carried by said third conveyor means, and means for driving said rotatable members, transfer mechanism and conveyor means in a predetermined relationship to each other.

2. A machine for applying sealing material to portions of a flat or sheetlike article, including means for supporting a stack of articles to which sealing material is to be applied, a feed mechanism for moving articles one at a time from said article supporting means, conveyor means adjacent said feed mechanism for engaging and moving the articles fed from said article supporting means in a predetermined direction, said conveyor means including movable elements engaging portions of each of said articles and retaining the same in a predetermined position relative to the movable elements throughout the movement of the conveyor means, means for applying sealing material to each of said articles as the same are carried by said conveyor means, said sealing applying means including a pair of side-by-side wheellike members supported on a rotatable drive shaft, each of said wheel-like members including segmental, cylindrical, spaced portions engageable with the desired portions of the articles, means for driving said rotatable shaft and said conveyor means in timed relation relative to each other so that during each revolution of said wheel-like members each of the segmental portions engages an article as the same is carried by the conveyor, sealing material container means supported adjacent said wheel members so that the segmental portions of said wheel members pass through the sealing material in the container means to pick up material to be applied to the articles.

3. A machine for applying sealing material to portions of a flat or sheetlike article, including means for supporting a stack of articles, a feed mechanism adjacent said article supporting means for moving the articles one at a time from said article supporting means, conveyor means supported adjacent said feed mechanism in position to receive the articles moved from said article supporting means, said conveyor means including a pair of endless belts having horizontal runs disposed in a back-to-back spaced relationship so as to receive the articles therebetween and move the same in a horizontal direction, means for driving said belts, backing members engaging the back-to-back horizontal runs of said belts so as to retain the spacing between said belts throughout the length of the conveyor means, said belts engaging portions of said articles to frictionally hold the same therebetween in a predetermined position and location so that the portions of the articles to which the sealing material is to be applied project laterally beyond the horizontal runs of the belts, means for applying sealing material to the projecting portions of each of the articles as the same are carried by said conveyor means, said sealing material applying means including a wheel-like member rotatably supported on one side of one of said belts and laterally outwardly of the belts so as to be in position to engage the projecting portions of the articles, each of said wheel means having spaced, segmental, cylindrical, peripheral portions on which the sealing material may be applied and which roll in engagement with articles carried by the conveyor means to apply sealing material to the articles, a backing member disposed on the opposite side of the other of said belts for engaging each of the articles during the rolling engagement of the segmental portions of the sealing material applying wheel member, additional conveyor means for receiving the articles from the first conveyor means and moving the articles in a predetermined direction, means supported adjacent said additional conveyor means for applying heat to the sealing material to dry the same.

4. A machine for applying sealing material to a portion of a flat or sheetlike article, including means for supporting a stack of articles, a feed mechanism supported adjacent said article supporting means for moving the articles one at a time from said article supporting means, conveyor means adjacent said feed mechanism for engaging the articles moved by said feed mechanism and conveying the same in a predetermined direction, said conveyor means including a pair of endless belt members having spaced back-to-back horizontal run portions between which the articles are carried, pulleys disposed adjacent opposite ends of the horizontal run of each of said belt members and a pulley disposed intermediate said first pulleys and vertically spaced relative thereto so as to provide in effect triangularly spaced pulleys about which each of the belt members extend, backing members disposed between the spaced pulleys and engaging the horizontal run of each of said belt members to maintain the spacing between said belt members' horizontal runs at a predetermined distance, the width of said belt members being less than the width of the articles carried thereby so that a portion of each article projects laterally outwardly beyond the belt members and on which portion sealing material is adapted to be placed, a wheel member supported below said belt members' horizontal runs and including segmental peripheral portions engageable with the laterally projecting article portions, a container disposed below said wheel member for sealing material through which the rotating segments of the wheel are adapted to pass, means for rotating said segmental wheel member and driving said belt members in timed relationship relative to each other so that a segmental portion of said wheel member will engage an article carried by the conveyor and roll the sealing material onto a portion thereof, second conveyor means disposed adjacent said first conveyor means and including spaced endless belt members having horizontal runs disposed adjacent said first conveyor means so as to receive articles therebetween and convey the same, said second conveyor means including a plurality of pulley members about which the endless belt members extend to provide said horizontal run and a horizontal run above the first horizontal run for conveying the articles in a direction opposite to that of the first horizontal run and thereby reverse the position of the articles with respect to their position in the first horizontal run, a third conveyor disposed adjacent said second conveyor second horizontal run for receiving articles therefrom and moving the same in a predetermined direction away from said second conveyor means.

5. A machine for applying sealing material to a portion of a flat or sheetlike article, including means for supporting a stack of articles, a feed mechanism adjacent said article supporting means for moving the articles one at a time from the article supporting means in a predetermined direction, conveyor means supported adjacent said feed mechanism for engaging the articles and moving the same in a predetermined direction, means supported adjacent said conveyor means for applying sealing material to each article as it is moved by said conveyor means, said sealing material applying means including a rotatable member having spaced, segmental, cylindrical, peripheral portions thereon, a container disposed adjacent said rotatable member for containing sealing material so that the segmental portions of said member rotate through the material in said container means, the opposite ends of the segmental portions of said members terminating in end faces which are angularly inclined or cut back and which faces join the side faces of the segmental portions through arcuate surfaces so that the segmental portions, when passing through the sealing material in the container means, will pick up the material on the periphery thereof but will tend to knife through the material and not agitate or cause excessive turbulence therein, the circumference of said segmental portions of said member being of a length to apply sealing material of a predetermined length on the articles carried by said conveyor, and scond conveyor means for moving said articles away from said first conveyor means.

6. A machine for applying sealing material to a portion of a flat or sheetlike article, including means for supporting a stack of articles, said article supporting means including confining side plate elements and spaced, inclined, ramplike means connected with each of said side plate elements and projecting laterally inwardly therefrom to support the opposite sides of the stack of articles, a rotatably supported shaft extending below said article supporting means and adjacent the bottom of the article stack, a rollerlike member connected to said shaft for engagement with the bottommost article in the stack, said roller member having means on the periphery thereof engageable with the lowermost article in the stack during a portion of the rotation thereof for moving the bottommost article away from said article supporting means, additional roller means supported inwardly of said first shaft, said roller means being in a position to engage the article moved inwardly by said first roller member and aid in projecting the same from the article supporting means, an article conveyor disposed inwardly of said article supporting means in a position to engage and convey articles fed from said article supporting means, a stop member supported adjacent said conveyor in a position to engage articles conveyed by said conveyor and retain the same in a predetermined position thereon, a member supported adjacent said conveyor for movement in a direction at right angles to the direction of movement of said conveyor, said member being engageable with the articles engaging said stop member to move the same away from said conveyor, reciprocating means connected with said member for causing the latter to reciprocate and move an article in said predetermined direction and then to return to its original position to engage the next article engaging said stop member, drive means connected with said roller means, said rotatably supported shaft, said reciprocating means and said conveyor to drive the same in timed relation relative to each other, second conveyor means adjacent said first conveyor means for engaging and moving articles delivered thereto by said member in a predetermined direction, and means supported adjacent said second conveyor means for applying sealing material to each article as it is conveyed by said second conveyor means.

7. A machine for applying sealing material to a portion of a flat or sheetlike article, including a supporting structure, a feed mechanism supported on said supporting structure for moving articles one at a time in a predetermined direction, conveyor means on said supporting structure adjacent said feed mechanism for engaging the articles moved by said feed mechanism and conveying the same in a predetermined direction, said conveyor means including a pair of endless belt members having spaced back-to-back horizontal run portions between which the articles are carried, pulleys disposed adjacent opposite ends of the horizontal run of each of said belt members, backing members disposed between the spaced pulleys and engaging the horizontal run of each of said belt members to maintain the spacing between said belt members' horizontal runs at a predetermined distance, the width of said belt members being less than the width of the articles carried thereby, so that a portion of each article projects laterally outwardly beyond the belt members and on the underside of which portion sealing material is adapted to be applied, a wheel member supported below said belt members' horizontal runs and including segmental, peripheral portions engageable with the laterally projecting article portions, a container disposed below said wheel member for sealing material through which the rotating segments of the wheel are adapted to pass, means for rotating said segmental wheel member and driving said belt members in timed relationship relative to each other so that a segmental portion of said wheel member will engage an article carried by said conveyor and roll the sealing material onto a portion thereof.

8. A machine for applying sealing material to a portion of a flat or sheetlike article, including a supporting structure, a feed mechanism supported on said supporting structure for moving articles one at a time in a predetermined direction, conveyor means on said supporting structure adjacent said feed mechanism for engaging the articles moved by said feed mechanism and conveying the same in a predetermined direction, said conveyor means including a pair of endless belt members having spaced back-to-back horizontal run portions between which the articles are carried, pulleys disposed adjacent opposite ends of the horizontal run of each of said belt members, backing members disposed between the spaced pulleys and engaging the horizontal run of each of said belt members to maintain the spacing between said belt members' horizontal runs at a predetermined distance, the width of said belt members being less than the width of the articles carried thereby, so that a portion of each article projects laterally outwardly beyond the belt members and on the underside of which portion sealing material is adapted to be applied, a wheel member supported below said belt members' horizontal runs and including segmental, peripheral portions engageable with the laterally projecting article portions, a container disposed below said wheel member for sealing material through which the rotating segments of the wheel are adapted to pass, means for rotating said segmental wheel member and driving said belt members in timed relationship relative to each other so that a segmental portion of said wheel member will engage an article carried by said conveyor and roll the sealing material onto a portion thereof, second conveyor means disposed adjacent said first conveyor means and including spaced back-to-back endless belt members having horizontal run portions adjacent to and in substantial alignment with said first conveyor means horizontal run portions so that said second conveyor means will pick up and convey the articles in a predetermined direction, said second conveyor means including a plurality of pulley members about which the endless belt members extend, one of said pulley members being disposed adjacent said first conveyor means so that articles reaching the end of said first conveyor means will be carried between the belt members of said second conveyor means, another of said pulley members being disposed rearwardly of said second conveyor means first pulley member and at the rearward end of said horizontal run so that the back-to-back belt members will extend around said second pulley member, additional pulley members supported forwardly of said second pulley member and above said first pulley member so that the belt members after extending around said second pulley member will extend forwardly above said first pulley member thereby reversing the position of the articles so that the portions of the articles to which the sealing material is applied will be facing upwardly after passing around said second pulley member, third conveyor means disposed adjacent said second conveyor means and in a position to receive articles from said second conveyor means for conveying said articles away from said second conveyor means in a predetermined direction.

9. A machine for applying sealing material to a portion of a flat or sheetlike article, including a stationary supporting structure, means on said structure for supporting a stack of articles, said article supporting means including confining side plate elements adjustably supported on said supporting structure for movement toward and away from each other to accommodate various sized articles, spaced, inclined, ramplike members connected with each of said side plate elements and projecting laterally inwardly therefrom to support the opposite sides of a stack of articles, a front plate element adjustably supported on said supporting structure between said confining side plate elements to aid in confining the articles in said article supporting means, a rotatably supported shaft extending below said envelope supporting means and adjacent the bottom of the article stack, a rollerlike member connected to said shaft for engagement with the bottommost article in the stack, said roller member having means thereon engageable with the lowermost article in the stack during a portion of the rotation thereof for moving the bottommost article away from said article supporting means, an article conveyor supported on said stationary supporting structure inwardly of said article supporting means in a position to engage and convey articles fed from said article supporting means in a predetermined direction, means adjustably supporting said conveyor means on said stationary supporting structure so that said conveyor means can be adjustably moved to correspond to the position of the article supporting means so as to properly receive articles fed from said article supporting means, a stop member supported on said stationary supporting structure adjacent said conveyor in a position to engage articles conveyed by said conveyor and retain the same in a predetermined position thereon, means adjustably supporting said stop member on said stationary supporting structure to permit said stop member to be moved fore and aft in the direction of conveyance of said conveyor means to accommodate and properly position articles of various sizes, a transfer member supported adjacent said conveyor for movement in a direction at right angles to the direction of movement of said conveyor, said member being engageable with the articles engaging said stop member to move the same away from said conveyor, reciprocating means connected with said member for causing the latter to reciprocate and move articles in said predetermined direction and then return to its original position to engage the next article engaging said stop member, means for adjusting the amount of movement of said article transfer member so that the member will transfer articles of various sizes to the same predetermined point at the end of its reciprocating stroke, drive means connected with said roller means, said reciprocating means and said conveyor to drive the same in timed relation relative to each other, second conveyor means adjacent said first conveyor means for engaging and moving articles delivered thereto by said reciprocating member in a predetermined direction, and means supported adjacent said second conveyor means for applying sealing material to each article as it is conveyed by said second conveyor means.

10. A machine for applying sealing material to a portion of a flat or sheetlike article, including a stationary supporting structure, means on said structure for supporting a stack of articles, said article supporting means including confining side plate elements adjustably supported on said supporting structure for movement toward and away from each other to accommodate various sized articles, spaced, inclined, ramplike members connected with each of said side plate elements and projecting laterally inwardly therefrom to support the opposite sides of a stack of articles, a front plate element adjustably supported on said supporting structure between said confining side plate elements to aid in confining the articles in said article supporting means, a rotatably supported shaft extending below said article supporting means and adjacent the bottom of the article stack, a rollerlike member connected to said shaft for engagement with the bottommost article in the stack, said roller member having means thereon engageable with the lowermost article in the stack during a portion of the rotation thereof for moving the bottommost article away from said article supporting means, an article conveyor supported on said stationary supporting structure inwardly of said article supporting means in a position to engage and convey articles fed from said article supporting means in a predetermined direction, means adjustably supporting said conveyor means on said stationary supporting structure so that said conveyor means can be adjustably moved to correspond to the position of the article supporting means so as to properly receive articles fed from said article supporting means, a stop member supported on said stationary supporting structure adjacent said conveyor in a position to engage articles conveyed by said conveyor and retain the same in a predetermined position thereon, means adjustably supporting said stop member on said stationary supporting structure to permit said stop member to be moved fore and aft in the direction of conveyance of said conveyor means to accommodate and properly position articles of various sizes, a transfer member supported adjacent said conveyor for movement in a direction at right angles to the direction of movement of said conveyor, said member being engageable with the articles engaging said stop member to move the same away from said conveyor, reciprocating means connected with said member for causing the latter to reciprocate and move articles in said predetermined direction and then return to its original position to engage the next article engaging said stop member, means for adjusting the amount of movement of said article transfer member so that the member will transfer articles of various sizes to the same predetermined point at the end of its reciprocating stroke, drive means connected with said roller means, said reciprocating means and said conveyor to drive the same in timed relation relative to each other, said drive means including change speed gearing to permit the speed of operation of the roller means, reciprocating means and said conveyor to be varied in accordance with the size of the articles being handled by the machine, a lever connected wtih said change speed gearing and engageable by a machine opertor to effect shifting of the change speed gearing, second conveyor means adjacent said first conveyor means for engaging and moving articles delivered thereto by said reciprocating member in a predetermined direction, and means supported adjacent said second conveyor means for applying sealing material to each article as it is conveyed by said second conveyor means.

11. A feed mechanism for a machine for applying sealing material to a portion of a flat or sheetlike article, including means for supporting a stack of articles, a rotatably supported shaft extending below said article supporting means, a rollerlike member connected to said shaft for engagement with the bottommost article in the stack, said roller member having peripheral side flanges thereon, a belt extending around the periphery of said roller member between said flanges, said flanges being cut out or notched over only a portion of their circumferential extent, the outer periphery of said belt being disposed radially inwardly of the peripheries of said flanges, except at said cut out portions, so that the periphery of said belt between said cut out portions is exposed to engage the bottommost article in said stack, during a portion of the rotation of said rollerlike member, to move the bottommost article away from said article supporting means, additional roller means supported inwardly of said first roller means and including vertically spaced roller members, the peripheries of which are spaced substantially the thickness of the articles being fed so as to prevent more than one article at a time from being fed from said article supporting means by said belt member on said roller member.

12. A device for applying sealing material to portions of flat or sheetlike articles being conveyed, including conveyor means for movably supporting articles with a portion of the articles projecting laterally beyond the conveyor, a wheel-like member rotatably supported below said conveyor and laterally outwardly thereof for engaging the projecting portions of the articles, said wheel-like member having spaced, segmental, cylindrical, peripheral portions thereon, a container supported below said wheel-like member for containing liquid sealing material, said container being supported in a position such that the segmental peripheral portions of said wheel-like member will rotate through the liquid sealing material contained therein, the opposite ends of said segmental wheel member portions terminating in end faces which are angularly inclined or cut back relative to the side faces of said segmental portions and which join the side faces of the segmental portions through arcuate surfaces so that the segmental portions, when passing through the liquid sealing material, will pick up the material on the periphery thereof but will tend to knife therethrough and not agitate or cause excessive turbulence thereof, and backing members disposed above said wheel-like members in backing engagement with the articles when the segmental portions engage the same, and means for driving said conveyor and rotating said wheel-like members in a predetermined relation relative to each other so that the segmental portions will properly engage each article carried by the conveyor.

13. An apparatus for applying sealing material to the portions of the underside of a flat sheetlike material such as an envelope including a conveyor comprising a pair of endless belts disposed in back-to-back relationship, means for delivering said articles to said conveyor so as to receive the articles therebetween in spaced relation and so that the article to which the sealing material is to be applied projects laterally beyond the side of the belt, a sealing containing receptacle mounted adjacent the side of the conveyor belts below the plane of movement of the belts, and a sealing material applicator member movably mounted to cooperate with the interior of said container, means for driving the conveyor belts to progress the articles carried thereby from one end of the belt to the other, means for operating the sealing material applicator, the means for operating the said belts and for operating the sealing material applicator being so synchronized that each article conveyed by the belts is in position to receive sealing material when the said article is approximately above said receptacle, and a conveyor mechanism cooperating with the first-mentioned conveyor at the discharge portion thereof for receiving the material and reversing the said sheet-like material so that the part having the sealing material thereon is uppermost.

14. An apparatus for applying sealing material to the underside of an envelope flap and adjacent body portion comprising conveyor means for receiving and retaining said envelopes in spaced relation with the flap facing downwardly and a portion of each envelope including the flap extending beyond the side of said conveyor means, a sealing material container mounted at one side of the conveyor means and below the plane of movement of the projecting portions of the envelope which are carried by the conveyor means, an applicator cooperating with the inner portion of the adhesive receptacle, means for operating said applicator to apply sealing material in succession to the projecting portions of the envelope, means for operating the conveyor, thereby to progress said envelopes carried thereby, the means for operating the conveyor means being synchronized so that the underside of each envelope is contacted by the applicator when the projecting portion of the envelope is approximately above the sealing material container, and a conveyor mechanism cooperating with the first-mentioned conveyor means at the discharge end thereof to receive the said envelopes from said conveyor means with the sealing material on the flap facing downwardly and reversing the envelope so that the flap with the sealing material on it is facing upwardly.

15. An apparatus for applying sealing material to the underside of a flap of an envelope and adjacent body portion of the envelope, comprising conveyor means including a pair of endless belts disposed in back-to-back relationship and adapted to receive envelopes delivered thereto between the belts, in spaced relation with the flap side of the envelope facing downwardly and the portion of the envelope and flap extending beyond the side of the said belts, a sealing material container mounted at that side of the conveyor belts from which the envelope projects and beneath the plane of movement of the conveyor belts, a sealing material applying member movably mounted to cooperate with the said container, means for operating the said member, the means for operating the sealing material applying member and the means for moving the endless belts being synchronized so that each article is contacted by the applicator when the projecting portion of the envelope is approximately above the sealing material container, and a conveyor mechanism cooperating with the first-mentioned conveyor means at the discharge end thereof to receive said envelope from said conveyor means with the sealing material on the flap facing downward and reversing the envelope so that the flap with the sealing material on it is facing upwardly.

16. The method of applying a strip of latex to the inside surface of the closure flaps of envelopes and a strip of latex to the surface of the envelope adjacent to the flap which consists in moving a series of envelopes progressively and in fixed relation with respect to each other and at a point in the progressing of the envelopes, applying strips of latex upon the underside of the envelope flap and the surface adjacent to said flap by a rolling action, that is, rolling the latex strips upon the envelope as above noted, and subsequent to applying latex to the envelopes progressing the envelopes in a reversed position so that the latex portion of the envelope is facing upwardly and drying the said latex.

17. A machine for applying sealing material to the underside of a portion of a flat or sheet-like article including conveyor means for engaging the articles in spaced relation and moving the same in a predetermined direction, means supported beneath and at one side of said conveyor means for supplying sealing material to the under side of each article which is moved by said conveyor means, said sealing material applying means including a rotatable member having spaced segmental cylindrical peripheral portions thereon, a sealing material container disposed adjacent said rotatable member so that the peripheral portions of the said member rotate in contact with the material in said container, the circumference of each segmental portion of said rotatable member being of a length to apply a strip of sealing material of a predetermined length on the article carried by the said conveyor and additional conveyor means for receiving each article after the application of the latex and moving the same so as to reverse the article so that the part thereof which has received the sealing material is uppermost in conveying the same so that it may be dried.

References Cited in the file of this patent

UNITED STATES PATENTS

| | | |
|---|---|---|
| 1,130,744 | Labombarde | Mar. 9, 1915 |
| 1,462,838 | Walraven | July 24, 1923 |
| 1,939,359 | Nelson | Dec. 12, 1933 |
| 1,945,648 | Lindgren | Feb. 6, 1934 |
| 1,986,039 | Ackley | Jan. 1, 1935 |
| 2,074,949 | Swift | Mar. 23, 1937 |
| 2,198,066 | Staude | Apr. 23, 1940 |
| 2,294,520 | Staude | Sept. 1, 1942 |
| 2,651,283 | Zinn | Sept. 8, 1953 |